United States Patent [19]

Tamura

[11] Patent Number: 4,720,088
[45] Date of Patent: Jan. 19, 1988

[54] OPTICAL SYSTEM SUPPORTING DEVICE

[75] Inventor: Yasuyuki Tamura, Kawasaki, Japan

[73] Assignee: Canon Kabushiki Kaisha, Tokyo, Japan

[21] Appl. No.: 609,199

[22] Filed: May 11, 1984

[30] Foreign Application Priority Data

May 18, 1983 [JP] Japan ................................ 58-85896
May 18, 1983 [JP] Japan ................................ 58-85897

[51] Int. Cl.⁴ .................... F16F 1/18; A47G 1/24; F16M 1/00; G02B 7/02
[52] U.S. Cl. ............................ 267/158; 248/476; 248/638; 267/160; 350/247; 350/255; 369/44; 369/45
[58] Field of Search ............... 267/148, 149, 158, 160, 267/164, 49, 61 R, 182, 154; 248/476, 602, 627, 630, 638; 250/239; 369/44, 45; 350/245, 246, 247, 252, 255; 235/454; 188/379, 378

[56] References Cited

U.S. PATENT DOCUMENTS

| | | | |
|---|---|---|---|
| 3,408,061 | 10/1968 | Meyer | 267/160 |
| 3,429,566 | 2/1969 | Rosendale | 267/41 X |
| 3,450,379 | 6/1969 | Nolan | 188/379 X |
| 4,215,915 | 8/1980 | Freiberg | 350/255 |
| 4,365,323 | 12/1982 | Heemskerk et al. | 369/44 |
| 4,449,213 | 5/1984 | Noborimoto et al. | 369/45 |
| 4,497,465 | 2/1985 | Yeakley et al. | 267/160 X |
| 4,538,882 | 9/1985 | Tanaka et al. | 267/160 X |
| 4,596,448 | 6/1986 | Kikuchi | 350/255 X |

FOREIGN PATENT DOCUMENTS

| | | | |
|---|---|---|---|
| 0208644 | 12/1982 | Japan | . |
| 0198550 | 12/1982 | Japan | 350/245 |
| 0012144 | 1/1983 | Japan | . |
| 0062836 | 4/1983 | Japan | . |
| 0061343 | 4/1983 | Japan | 267/158 |

Primary Examiner—Andres Kashnikow
Assistant Examiner—Robert J. Oberleitner
Attorney, Agent, or Firm—Fitzpatrick, Cella, Harper & Scinto

[57] ABSTRACT

An optical system supporting device which comprises: a pair of first leaf springs which are in parallel with the optical axis of the optical system, but non-parallel to each other, and each one end thereof is fixed to a main body; a pair of second leaf springs which are perpendicular to the optical axis of the optical system, are mutually in parallel, and to each one end thereof the optical system is fixed; and an intermediate supporting member to support the other end of each of said first and second leaf springs.

10 Claims, 11 Drawing Figures

OPTICAL SYSTEM SUPPORTING DEVICE

BACKGROUND OF THE INVENTION

1. Field of the Invention

This invention relates to a device for supporting an optical system, and, more particularly, it is concerned with an improvement in the device for supporting the optical system such as an object lens or an optical head of a recording and reproducing apparatus, etc. in a manner to be movable in two-dimensional directions.

2. Description of the Prior Art

In an optical recording and reproducing apparatus, etc., it has heretofore been a practice to move its object lens at a high speed in the optical axis direction or a direction perpendicular to the optical axis so as to perform the automatic focus control for forming a light spot on a recording medium or the tracking control for letting the light spot trace the recording track. By such high speed movement of the object lens, etc., however, there arose such a problem that the optical axis of the object lens, etc. tends to tilt. With a view to removing such a problem, there has so far been made various proposals on the optical system supporting device, wherein the inclination of the object lens, etc. is reduced by utilization of a leaf spring, and the like. As examples for such device, there may be one as shown in FIG. 1 of the accompanying drawing, which is movable two-dimensionally; or another as shown in FIG. 2, which is movable in a single dimensional direction; or still another as shown in FIG. 3, which is movable three-dimensionally; and so forth.

In FIG. 1, the leaf springs 2a, 2b enable the object lens 1 to move in the direction of the optical axis, while the leaf springs 3a, 3b enable it to move in the direction perpendicular to the optical axis. A reference numeral 4 designates an intermediate supporting member, and a numeral 5 refers to a main body mounting plate. In FIG. 2, radially extending portions 7a, 7b of two leaf springs 6a, 6b, respectively, enable the object lens 1 to move in the direction of the optical axis. The annular portions of the leaf springs 6a, 6b are fixed to the main body. In FIG. 3, leaf springs 8a, 8b enable the object lens 1 to move in the lateral direction, leaf springs 9a, 9b in the vertical direction, and leaf springs 10a, 10b in the optical axis direction. A reference numeral 11 designates an intermediate supporting member, and numeral 13 refers to a main body mounting plate.

However, of these optical system supporting devices having such construction as mentioned above, those as shown in FIGS. 1 and 3 which support the object lens in a manner to be movable in two or three dimensional directions still involve problems such that they tend to cause the object lens to tilt readily, are inferior in their tracking characteristic at a high speed operation inasmuch as an object lens supporting part consisting of the leaf springs, etc. has a large moving quantity, are difficult to perform accurate and delicate control for very fine and small moving quantity, since the devices are not smooth in movement, and others, with the consequence that there has not yet been realized the optical system supporting device which is perfectly free from these disadvantages. A method, wherein the entire optical system including a photo-detector, etc., not to say of the object lens, is caused to move as an integral whole, has also been proposed. Even in this case, however, the same problems as mentioned above still remained.

SUMMARY OF THE INVENTION

It is therefore an object of the present invention to provide an optical system supporting device which is capable of moving the optical system smoothly and at a high speed without causing the optical axis of the optical system to tilt.

According to a general aspect of the present invention, there is provided an optical system supporting device which comprises: a pair of first leaf springs which are in parallel with the optical axis of the optical system, but non-parallel with each other, and one end of each is fixed to the main body; a pair of second leaf springs which are perpendicular to the optical axis of the optical system, are mutually in parallel, and one end each of which is fixed to the optical system; and an intermediate supporting member to support the other end of each of said first and second leaf springs, thereby making it possible to move the optical system in a relatively large quantity in the direction perpendicular to the optical axis with a small moving quantity of the intermediate supporting member by the curvature of said mutually non-parallel first leaf springs.

The foregoing object, other objects as well as specific construction and function of the optical system supporting device according to the present invention will become more apparent and understandable from the following detailed description thereof, when read in conjunction with the accompanying drawing.

DETAILED DESCRIPTION OF THE PREFERRED EMBODIMENT

Figure 4:
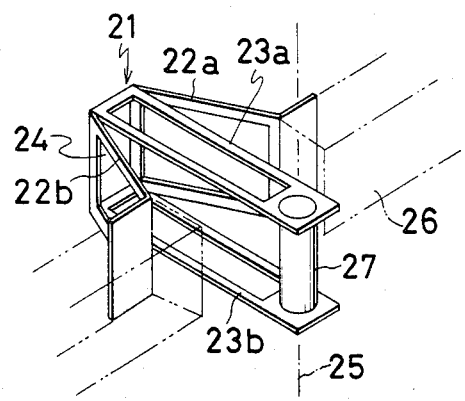
FIG. 4 is a perspective view showing a preferred embodiment of the optical system supporting device according to the present invention.
Figure 5A:
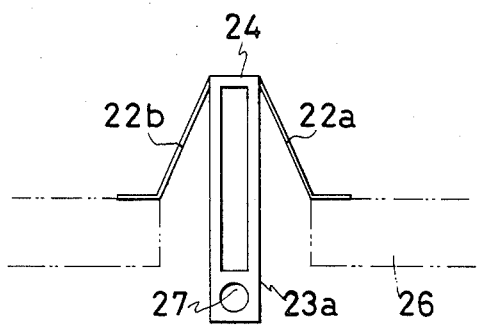
FIGS 5A and 5B are plan views of the optical system supporting device shown in FIG. 4.
Figure 5B:
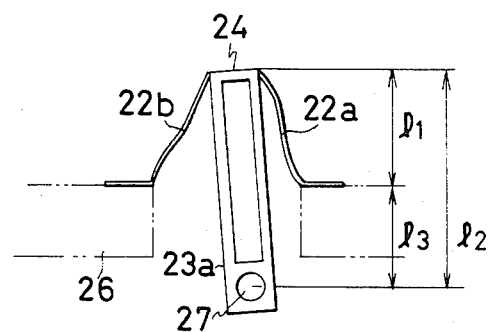

In the following, the present invention will be described in detail with reference to a preferred embodiment thereof shown in FIGS. 4 through 6B inclusive, wherein FIG. 4 is the perspective view of the optical system supporting device of the present invention; FIGS. 5A and 5B are the plan views of the optical system supporting device shown in FIG. 4; and FIGS. 6A and 6B are the cross-sectional views of the optical system supporting device in FIG. 4.

In the drawing, the optical system supporting device 21 is constructed with a pair of first leaf springs 22a, 22b; a pair of second leaf springs 23a, 23b; and an intermediate supporting plate 24. The first leaf springs 22a, 22b, the second leaf springs 23a, 23b, and the intermediate supporting plate 24 are formed integrally of a single sheet of a spring material. Further, each of the first leaf springs 22a, 22b and the second leaf springs 23a, 23b has a rectangular opening cut out therein with the exception of its both end parts so as to increase pliability and to be movable even with feeble force. The first leaf springs 22a, 22b are non-parallel to each other, but parallel with the optical axis 25. One end of each of the leaf springs is fixed to the main body 26, and the other end thereof is continuous with both sides of the intermediate supporting plate 24. The second leaf srpings 23a, 23b are mutually parallel, and perpendicular to the optical axis 25. One end of each of the leaf springs is connected with the object lens 27, and the other end thereof is continuous with both upper and lower sides of the intermediate supporting plate 24.

When viewed from above (i.e. the optical axis direction with the object lens 27 being positioned at the center, the optical system supporting device 21 forms a symmetrical trapezoid, as shown in FIG. 5A, with the first leaf springs 22a, 22b, the intermediate supporting plate 24, and the main body 26. In case the object lens 27 moves in the direction perpendicular to the optical axis 25 (i.e., the rightward direction in FIG. 5B), the second leaf springs 23a, 23b rotationally move in the counter-clockwise direction with movement of the object lens 27, and, at the same time, the intermediate supporting plate 24 shifts in the rightward direction accompanying the counter-clockwise rotation. Moreover, the first leaf springs 22a, 22b are subjected to distortion in an "S" shape. At this juncture, the object lens 27 rotates somewhat in the counter-clockwise direction, which, however, does not cause any optical mal-effect, nor does the optical axis of the object lens 27 incline, as a matter of course.

Figure 6A:
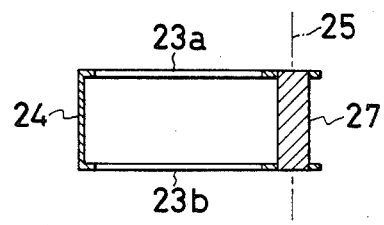
FIGS. 6A and 6B are cross-sectional views of the device shown in FIG. 4.
Figure 6B:
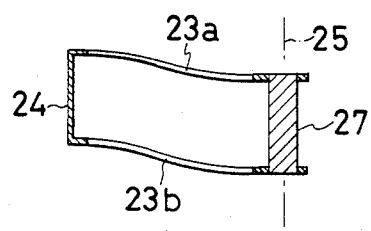

When viewed in cross-section, the object lens 27 and the intermediate plate 24 of the optical system supporting device 21 are mutually in parallel and the second leaf springs 23a, 23b are also mutually in parallel, as shown in FIG. 6A (the first leaf springs 22a, 22b, being not shown), whereby these component elements form a rectangle. When the object lens 27 moves in the direction of the optical axis 25, e.g., in the downward direction (a state as shown in FIG. 6B), the second leaf springs 23a, 23b are subjected to distortion in the same shape, hence both intermediate supporting plate 24 and the object lens 27 are maintained in exact parallellism, and the optical axis of the object lens 27 is not inclined. When the object lens 27 moves in the up and down directions, both intermediate supporting plate 24 and the first leaf springs 22a, 22b do not move, so that the mass of the movable portion is small.

As seen from what has been mentioned in the preceding, the moving quantities of the first leaf springs 22a, 22b, the second leaf springs 23a, 23b, and the intermediate supporting plate 24 are smaller than the moving quantity of the object lens 27. Since the apparent mass of the movable part is determined by a product of the mass and the moving quantity, the apparent mass of the movable part becomes small due to the fact that the moving quantity of those portions other than the object lens 27 is small. Further, when the object lens 27 moves in the direction perpendicular to the optical axis 25 (see: FIG. 5B), the intermediate supporting plate 24 comes somewhat closer to the main body 26, and a distance $l_1$ becomes short. At this time, since the second leaf springs 23a, 23b are positioned aslant and a distance $l_2$ becomes somewhat short, a distance $l_3$ between the object lens 27 and the main body 26 does not change to a substantial degree, which is an advantage of this construction.

Figure 7:
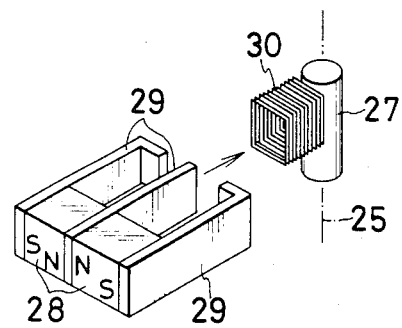
FIG. 7 is a perspective view showing one example of a driving means for the optical system supporting device according to the present invention shown in FIG. 4.

In the embodiment shown in FIGS. 4 through 6B, means for driving the object lens 27 is not illustrated. Such driving means may be a combination of a winding and a magnet, as is usually practised. One example of such driving means is shown in FIG. 7, in which permanent magnets 28 and magnetic members 29 are shown to be separated from a hollow winding 30, for the sake of clarity. In actual use, however, the magnetic member 29 at the center is inserted into the hollow winding 30 (in the arrowed direction in FIG. 7), and the magnetic members 29 at both sides are disposed outside the hollow winding 30 at their mutually opposing positions.

By electric conduction through the hollow winding 30, the object lens 27 receives force in the direction perpendicular to the optical axis 25, and is driven, for example, as shown in FIG. 5B. By the way, in order to drive the object lens 27 in the direction of the optical axis 25, a separate driving means may be provided in the direction posing the right angle with respect to the position shown in FIG. 7.

Generally speaking, in the optical system supporting device using the leaf springs, etc., there has been a problem such that the device brings about resonace by its movement along with movement of the object lens, etc..

While high powered servo-control (having a high servo gain) is required for performing the automatic focus control and the tracking control, if the optical system supporting device brings about strong resonance, the control operations become unstable in the vicinity of the resonant frequency, and, at the same time, the phase is rotated to make it difficult to apply the servo-control. However, if a damper is provided for reducing the resonance to the smallest possible degree, not only the construction of the optical system supporting device becomes complicated and expensive, but also the mass of the movable part increases to become difficult to drive the device at a high speed. It has so far been a general practice to use rubber as the damper material. However, rubber not only tends to readily fluctuate in its characteristics, but also brings about deterioration with lapse of time.

Figure 8:
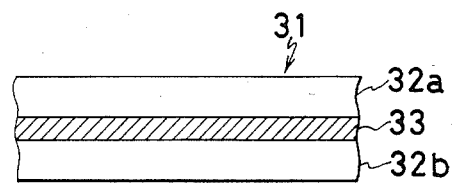
FIG. 8 is a partial cross-sectional view showing one example of a construction of the leaf spring material for use in the optical system supporting device according to the present invention.

Therefore, in the embodiment of the present invention as shown in FIGS. 4 through 6B, the leaf spring member has a structure as shown in FIG. 8, whereby the above mentioned problem is readily solved, and the resonance can be kept as low as possible without use of the damper. In FIG. 8, the leaf spring member 31 is composed of materials 32a, 32b for the thin leaf spring and adhesive agent 33 interposed between these thin leaf spring materials. For the thin leaf spring material 32a, 32b, there may be used various materials such as, for example, thin plate of metals like phosphor bronze, stainless steel, iron, steel, nickel silver, titanium, and others; high polymeric materials like polyethylene terephthalate, polyamide resin, polyimide resin, and others; those high polymeric materials reinforced with glass fiber, carbon fiber, and so on; and various others. These materials possess such characteristics that they are relatively supple in their curving direction, and tenacious in their stretching and contracting direction as well as shearing direction. Thickness of the thin leaf springs 32a, 32b should appropriately be in a range of from 0.03 mm to 0.1 mm in the case of the metal material, and from 0.1 mm to 0.3 mm in the case of the high polymeric material. The optimum value, however, depends on the mass of the optical system (the object lens, the optical head) to be supported, size of the drive winding, strength of the magnet, and so forth. While each of the thin leaf springs 32a, 32b may be made of different material and have different thickness, the maximum effect can be obtained with the same material and the same thickness for both of them.

For the adhesive agent 33, there may be used acrylic type adhesive agent such as, for example, DB-5520, DB-5537 (both products of Dia-Bond Kogyo K.K., Japan); acrylic emulsion type adhesive agent such as, for example, DB-5600 (a product of Dia-Bond Kogyo K.K., Japan); chloroprene rubber type adhesive agent such as, for example, DB-611 (a product of Dis-Bond Kogyo K.K., Japan); urethane type adhesive agent such as, for example, DB-1910 (a product of Dia-Bond Kogyo K.K., Japan); NBR type adhesive agent such as, for example, DB-1840 (a product of Dia-Bond Kogyo K.K., Japan); and so forth. Besides these adhesive agents, there may be used adhesive substances such as synthetic rubber type adhesive agent, regenerated rubber type adhesive agent, natural rubber type adhesive agent, and so on. Even hot-melt adhesive agent, etc. may be used, provided that it has viscoelasticity at a normal temperature. Appropriate thickness of the adhesive agent 33 generally ranges from 0.01 mm to 0.1 mm.

In fabricating the leaf spring member 31, the adhesive agent 33 diluted with a solvent is applied on one surface of the thin spring material 32a, and, after evaporation of the solvent, the other thin leaf spring material 32b is adhered thereto. The thus formed combination of the thin leaf spring materials are then subjected to pressing, etching, and other working to be made into the leaf spring member of a predetermined shape. When the thus fabricated leaf spring is curved in an arbitrary direction, there takes place sliding in the layer of the adhesive agent 33; however, since this adhesive layer is a viscous member, a strong braking effect is brought about therein. By this strong braking action in the layer of the adhesive agent 33, the resonance taking place in the thin leaf spring 32a, 32b can be suppressed to the minimum possible extent. Incidentally, when the adhesive agent 33 is excessively thick, working process such as pressing, etching, etc. become difficult. On the other hand, when the adhesive agent has an excessively thin layer thickness, no satisfactory damping effect can be exhibited. FIG. 8 illustrates the leaf spring comprising a pair of thin leaf spring material 32a, 32b and the adhesive agent 33 interposed between the thin leaf spring materials 32a, 32b, although the thin leaf spring material is not limited to a pair, but three or more layers may be laminated. However, when the number of layers increases, the spring constant becomes high. Therefore, it is not so preferable to laminate the leaf spring material in an excessively large number.

Figure 1:
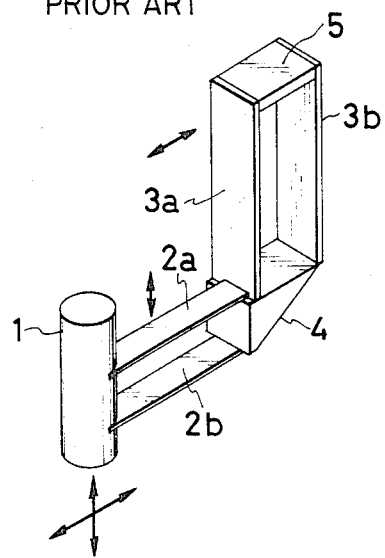
FIGS. 1 to 3 are perspective views showing examples of conventional optical system supporting devices.
Figure 2:
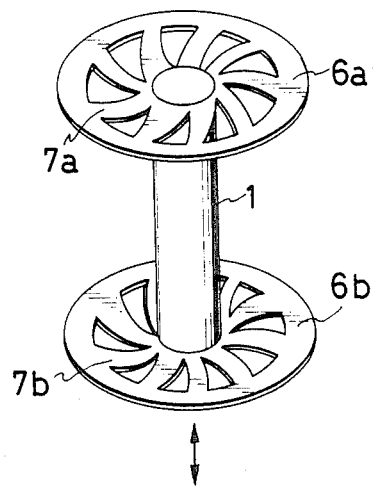
Figure 3:
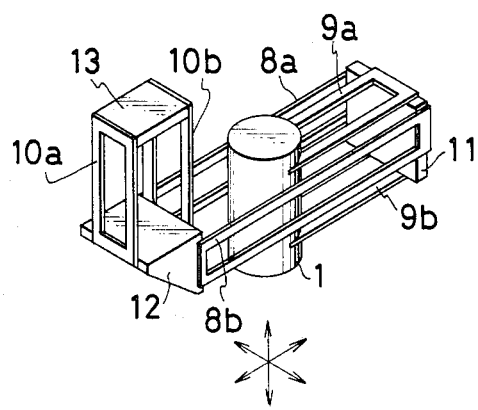
Figure 9:
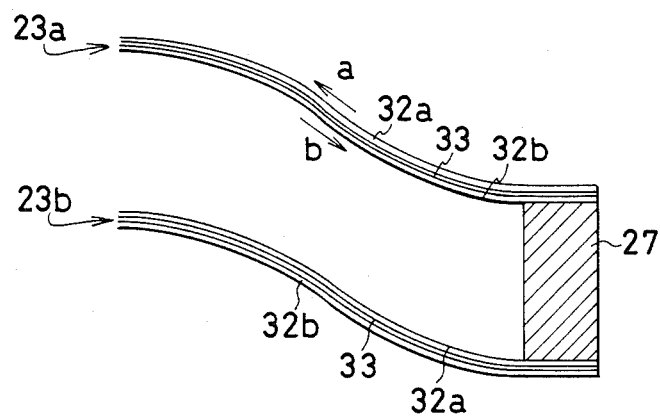
FIG. 9 is a cross-sectional view for explaining the effect of the leaf spring material shown in FIG. 8 when it is used in the optical system supporting device.

Further effect to be derived from such leaf spring member will be explained in reference to FIG. 9, when it is applied to the second leaf springs 23a, 23of the embodimeent shown in FIGS. 4 to 6B, as an example. Since the thin leaf spring materials 32a and 32b are relatively difficult to stretch and contract, when they are curved downward as shown in FIG. 9, the leaf spring material 32a on the upper side of the lamination is drawn in the arrow direction a, while the lower leaf spring 32b in the arrow direction b, whereby the second leaf springs 23a 23b tend to curve in an S-shape rather than they are convex or concave in one direction (the optical axis direction). On account of this, when the object lens 27 is supported by the second leaf spring pair 23a, 23b, as shown in FIG. 3, a force acts in the direction to reduce the inclination of the object lens 27 to an extent smaller than in the case of using a simple leaf spring, whereby the inclination of the optical axis of the object lens 27 can be made small. Such leaf spring may be used in the conventional optical system supporting device as shown in FIGS. 1 through 3. However, when it is used in combination with the optical system supporting device of the present invention, particular effect can be derived owing to the optical axis of the optical system being not inclined.

The present invention is applicable not only in the case of supporting the object lens alone as already mentioned in the foregoing, but also in the case of supporting the optical system as a whole, wherein the photodetector and other elements are integrally combined. Further, the leaf spring member for use in the present invention is not limited to the construction as shown in FIG. 8, but may be formed of a single sheet of ordinary metal plate or high polymeric material. Furthermore, in the preferred embodiment of the present invention as shown in FIGS. 4 through 6B, the first leaf springs 22a, 22b, the second leaf springs 23a, 23b, and the intermediate supporting plate 24 are integrally formed. However, they may be shaped separately and individually, and then connected together. Moreover, the intermediate supporting plate 24 need not be made of a spring material, nor be in the shape of a plate. Furthermore, in this embodiment, the optical system is supported in a manner to be movable in the two-dimensional directions. However, it may also be feasible that the portion as designated by the main body be supported by the leaf spring, etc. in a movable manner, and the optical system be made movable in the three-dimensional directions.

Although, the present invention has been described in specific details in the foregoing, it should be understood that changes and modifications may be made by those persons skilled in the art within the ambit of the present invention as recited in the appended claims.

I claim:

1. An optical system supporting device for supporting an optical system, comprising:
   (a) a pair of first leaf springs which are in parallel with the optical axis of the optical system, but non-parallel to each other, each one end of which is fixed to a main body, and each other end of which is movable relative to the main body along a direction normal to the optical axis, the distance between said pair of first leaf springs being largest at the ends thereof fixed to the main body and smallest at the other ends thereof, said distance being gradually tapered from the ends fixed to the main body toward the other ends;
   (b) a pair of second leaf springs which are perpendicular to the optical axis of the optical system and are mutually in parallel, to each one end of which the optical system is fixed;
   (c) an intermediate supporting member for supporting the other end of each of said first and second leaf springs, said pair of second leaf springs extending from said intermediate supporting member toward said main body; and
   (d) each of said first and second leaf springs having a cut-out portion at a portion excluding its both ends.

2. The optical system supporting device as set forth in claim 1, wherein said first leaf springs and said intermediate supporting member assume a symmetrical trapezoidal form with the main body as its bottom side, when viewed from the direction of the optical axis.

3. The optical system supporting device as set forth in claim 2, wherein said intermediate supporting member forms the top side of said trapezoid.

4. The optical system supporting device as set forth in claim 1, wherein said first leaf springs, said second leaf springs and said intermediate supporting member are integrally formed of a single sheet of spring material.

5. The optical system supporting device as set forth in claim 1, further comprising means for driving the optical system at least in a direction perpendicular to the optical axis of the optical system, said means being provided adjacent to the optical system.

6. An optical system supporting device for supporting an optical system, comprising:
   (a) a pair of first leaf springs which are in parallel with the optical axis of the optical system, but non-parallel to each other, each one end of which is fixed to a main body, and each the other end of which is movable relative to the main body along a direction normal to the optical axis, the distance between said pair of first leaf springs being largest at the ends thereof fixed to the main body and smallest at the other ends thereof, said distance being gradually tapered from the ends fixed to the main body toward the other ends;
   (b) a pair of second leaf springs which are perpendicular to the optical axis of the optical system and are mutually in parallel, to each one end of which the optical system is fixed;
   (c) an intermediate supporting member for supporting the other end of each of said first and second leaf springs, said pair of second leaf springs extending from said intermediate supporting member toward said main body; and
   (d) each pair of said first and second leaf springs being made of, at least at one part thereof, laminated thin leaf spring materials and a layer of an adhesive agent interposed between said laminated thin leaf spring materials, said adhesive agent having viscoelasticity at a normal temperature.

7. The optical system supporting device as set forth in claim 6, wherein said thin leaf spring material is made of metal material having thickness of from 0.03 mm to 0.1 mm.

8. The optical system supporting device as set forth in claim 6, wherein said thin leaf spring material is made of high polymeric material having thickness of from 0.1 mm to 0.3 mm.

9. The optical system supporting device as set forth in claim 6, wherein said adhesive agent has a layer thickness of from 0.01 mm to 0.1 mm.

10. The optical system supporting device as set forth in claim 6, further comprising means for driving the optical system at least in a direction perpendicular to the optical axis of the optical system, said means being provided adjacent to the optical system.

* * * * *